United States Patent
Muhanna et al.

(10) Patent No.: US 9,253,815 B2
(45) Date of Patent: Feb. 2, 2016

(54) SESSION SUSPEND AND RESUME USING A TRANSIENT BINDING OPTION MESSAGING

(75) Inventors: Ahmad S. Muhanna, Richardson, TX (US); Michael Brown, McKinney, TX (US); Mohamed Khalil, Murphy, TX (US)

(73) Assignee: Apple Inc., Cupertino, CA (US)

( * ) Notice: Subject to any disclaimer, the term of this patent is extended or adjusted under 35 U.S.C. 154(b) by 904 days.

(21) Appl. No.: 13/138,985

(22) PCT Filed: May 13, 2010
(Under 37 CFR 1.47)

(86) PCT No.: PCT/US2010/034785
§ 371 (c)(1),
(2), (4) Date: Jan. 23, 2012

(87) PCT Pub. No.: WO2010/132700
PCT Pub. Date: Nov. 18, 2010

(65) Prior Publication Data
US 2012/0129526 A1    May 24, 2012

Related U.S. Application Data

(60) Provisional application No. 61/177,794, filed on May 13, 2009.

(51) Int. Cl.
H04W 36/00    (2009.01)
H04W 76/04    (2009.01)
H04W 36/02    (2009.01)

(52) U.S. Cl.
CPC ........ *H04W 76/048* (2013.01); *H04W 36/0022* (2013.01); *H04W 36/023* (2013.01)

(58) Field of Classification Search
CPC .. H04W 76/048; H04W 36/023; H04W 36/00
USPC ......................................... 455/436; 370/338
See application file for complete search history.

(56) References Cited

U.S. PATENT DOCUMENTS

| 7,039,404 | B2 | 5/2006 | Das et al. |
| 7,392,036 | B2 | 6/2008 | Huomo |

(Continued)

FOREIGN PATENT DOCUMENTS

| EP | 1615394 A1 | 11/2006 |
| EP | 1912385 | 4/2008 |

(Continued)

OTHER PUBLICATIONS

Notice of Allowance from Korean Patent Application No. 10-2011-7029694, mailed Apr. 10, 2014, pp. 1-8.

(Continued)

*Primary Examiner* — Marcos Batista
(74) *Attorney, Agent, or Firm* — Meyertons, Hood, Kivlin, Kowert & Goetzel, P.C.

(57) ABSTRACT

The present invention uses a message with a suspend/resume flag setting sent to the local mobility anchor from the foreign agent that was supporting downlink transmissions to the mobile node. Namely, a transient binding option is proposed for creating a transient BCE state at the home agent/local mobility anchor during an inter-MAG handover, which will suspend down-link traffic from the home agent/local mobility anchor until the transient BCE (suspend) state is cleared by the foreign agent previously supporting downlink transmissions. After the transient BCE (suspend) state is cleared, the downlink traffic from the home agent/local mobility anchor can resume with forwarding of downlink traffic to the mobile node through the foreign agent. The present invention can be implemented using a new protocol application or modified messages from prior registration applications.

20 Claims, 2 Drawing Sheets

(56) References Cited

U.S. PATENT DOCUMENTS

| | | | |
|---|---|---|---|
| 7,471,634 | B1 | 12/2008 | Wenzel et al. |
| 2004/0097230 | A1 | 5/2004 | Natarajan et al. |
| 2005/0226154 | A1 | 10/2005 | Julka et al. |
| 2006/0084440 | A1 | 4/2006 | Bakri |
| 2006/0104262 | A1 | 5/2006 | Kant et al. |
| 2006/0274672 | A1* | 12/2006 | Venkitaraman et al. ...... 370/254 |
| 2008/0102749 | A1 | 5/2008 | Becker |
| 2008/0130637 | A1 | 6/2008 | Kant et al. |
| 2008/0259876 | A1 | 10/2008 | Qiang et al. |
| 2010/0135206 | A1* | 6/2010 | Cherian et al. ................. 370/328 |
| 2010/0223365 | A1 | 9/2010 | Liebsch et al. |
| 2010/0246500 | A1* | 9/2010 | Rydnell et al. ................. 370/329 |
| 2010/0325416 | A1* | 12/2010 | Haddad ........................... 713/150 |
| 2011/0085489 | A1* | 4/2011 | Rydnell et al. ................. 370/312 |

FOREIGN PATENT DOCUMENTS

| | | |
|---|---|---|
| JP | 2004363730 | 12/2004 |
| RU | 2349057 | 3/2009 |
| WO | 2009036993 | 3/2009 |

OTHER PUBLICATIONS

Notice of Allowance from Russian Application No. 2412-512639RU/8132, mailed May 28, 2014, pp. 1-17.

International Searching Authority: Notification of Transmittal of International Search Report, Written Opinion of Int'l Searching Authority, or the Declaration dated Jul. 21, 2010. cited by other.

International Searching Authority: International Search Report Report dated Jul. 21, 2010. cited by other.

International Searching Authority: Written Opinion of the International Searching Authority dated Jul. 21, 2010. cited by other.

Office Action from Japanese Patent Application No. 2012-511021, mailed Dec. 9, 2013, English and Japanese versions, pp. 1-3.

Office Action from Canadian Application No. 2761668, issued Dec. 4, 2014, pp. 1-12.

Office Action from Chinese Application No. 201080032448.1, issued Jan. 13, 2015, English and Chinese versions, pp. 1-16.

Supplementary Search Report, European Application No. 10775557.1, mailed Jul. 2, 2015, 9 pages.

Huawei: "Discussion About PS Handover for CS Fallback", 3GPP Draft; S2-082233, 3rd Generation Partnership Project (3GPP), Mobile Competence Centre; 650, Route des Lucioles; F-06921 Sophia-Antipolis Cedex; France, Col. SA WG2, No. Jeju; Apr. 1, 2008, XP050264592, full section 2.

Samsung: "Suspending EPS bearers", 3GPP Draft; S2-084145 CSFB Suspend R4, 3rd Generation Partnership Project (3GPP), Mobile Competence Centre; 650, Route des Lucioles; F-06921 Sophia-Antipolis Cedex; France, Col. SA WG2, No. Prague; May 16, 2008, XP050266285, Section 2.1; p. 1, Section 6.3; p. 2, Section 6.5; p. 3.

NEC et al: "Harmonization of PMIP and GTP based Handover Behaviour for Handover from non-3GPP to 3GPP accesses", 3GPP Draft; S2-085788 Harmonization PMIP-GTP-Based Ho Behaviour, 3rd Generation Partnership Project (3GPP), Mobile Competence Centre; 650, Route des Lucioles; F-06921 Sophia-Antipolis Cedex; France, vol. SA WG2, No. Sophia; Aug. 19, 2008, XP050267799, 4 pages.

Muhanna Nortel V Devarapalli Wichorus S Gundavelli Cisco Systems A: "Mobility Session Suspend Support in PMIPv6; draft-muhanna-netext-mobility-session-suspend-00.txt", Internet Engineering Task Force, IETF; Standard Working Draft, Internet Society (ISOC) 4, Rue des Falaises CH-1205 Geneva, Switzerland, Jun. 25, 2009, XP015062848, 9 pages.

* cited by examiner

SESSION SUSPEND AND RESUME USING A TRANSIENT BINDING OPTION MESSAGING

RELATED APPLICATION DATA

This application is related to Provisional Patent Application Ser. No. 61/177,794 filed on May 13, 2009, and priority is claimed for this earlier filing under 35 U.S.C. §119(e). The Provisional patent application is also incorporated by reference into this utility patent application.

TECHNICAL FIELD OF THE INVENTION

A method and system that suspends and resumes a wireless communication session using a new flag, option or message transmission.

BACKGROUND OF THE INVENTION

IP-based mobile systems provide for communication between at least one mobile node and a wireless communication network. The term "mobile node" includes a mobile communication unit (e.g., mobile terminal, "smart phones," nomadic devices such as laptop PCs with wireless connectivity, as described in greater detail below). Among other elements, the wireless communication system includes a home network and a foreign network. The mobile node may change its point of attachment to the Internet through these networks, but the mobile node will always be associated with a single home network for IP addressing purposes. The home network includes a home agent and the foreign network includes a foreign agent—both of which control the routing of information packets into and out of their network.

The mobile node, home agent and foreign agent may be called different names depending on the nomenclature used on any particular network configuration or communication system. For instance, a "mobile node" encompasses PC's having cabled (e.g., telephone line ("twisted pair"), Ethernet cable, optical cable, and so on) connectivity to the wireless network, as well as wireless connectivity directly to the cellular network, as can be experienced by various makes and models of mobile terminals ("cell phones") having various features and functionality, such as Internet access, e-mail, messaging services, and the like. Mobile nodes are sometimes called a user equipment, mobile unit, mobile terminal, mobile device, or similar names depending on the nomenclature adopted by particular system providers. Generally, there is also a correspondence node, which may be mobile or fixed, that may be located on the network for communicating with the mobile node.

A home agent may also be referred to as a Local Mobility Anchor, Home Mobility Manager, Home Location Register, and a foreign agent may be referred to as a Mobile Access Gateway, Serving Mobility Manager, Visited Location Register, and Visiting Serving Entity. The terms mobile node, home agent and foreign agent are not meant to be restrictively defined, but could include other mobile communication units or supervisory routing devices located on the home or foreign networks. Foreign networks can also be called serving networks.

Registering the Mobile Node

Foreign agents and home agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a home agent, a foreign agent, etc.) to a mobile node. Mobile nodes examine the agent advertisement and determine whether they are connected to the home network or a foreign network.

The mobile node will always be associated with its home network and sub-network for IP addressing purposes and will have information routed to it by routers located on the home and foreign network. If the mobile node is located on its home network, information packets will be routed to the mobile node according to the standard addressing and routing scheme. If the mobile node is visiting a foreign network, however, the mobile node obtains appropriate information from the agent advertisement, and transmits a registration request message (sometimes called a binding update request) to its home agent through the foreign agent. The registration request message will include a care-of address for the mobile node. A registration reply message (also called a binding update acknowledge message) may be sent to the mobile node by the home agent to confirm that the registration process has been successfully completed.

The mobile node keeps the home agent informed as to its location on foreign networks by registering a "care-of address" with the home agent. The registered care-of address identifies the foreign network where the mobile node is located, and the home agent uses this registered care-of address to forward information packets to the foreign network for subsequent transfer onto the mobile node. If the home agent receives an information packet addressed to the mobile node while the mobile node is located on a foreign network, the home agent will transmit the information packet to the mobile node's current location on the foreign network using the applicable care-of address. That is, this information packet containing the care-of address will then be forwarded and routed to the mobile node on the foreign network by a router on the foreign network according to the care-of address.

Multiple interfaces may be supported on a single or multiple foreign networks, which can include the different communication access types 802.11d, 802.11g, HRPD, WiFi, WiMax, CDMA, or LTE apart from the circuit-switched type of telephone communication access types. Problems can be encountered when the mobile node becomes coupled to different access types on a single or multiple networks, or when hand-over procedures are performed from one access type to another access type. When mobile nodes move from one foreign network to another foreign network, problems are sometimes encountered with the registration of the care of addressing with the home agent or local mobility anchor. For instance, problems can arise with hand-off procedure for a communication when the home agent or local mobility anchor may drop packets or bill for dropped packets, which can disrupt transmissions and cause billing discrepancies. (e.g. billing the subscriber for packets that were never received).

SUMMARY OF THE INVENTION

This invention provides for accurate hand-over procedures and billing of transmission packets through a new method and system for suspending and resuming downlink communication transmissions. The invention addresses the situation where a mobile node is transitioned to a new foreign network or a second access type on the same foreign network (multiple access types are supported on the foreign network), but the new foreign network does not support downlink transmissions to the mobile node. It is primary objective of this invention to provide sufficient information from the local mobility agent so the mobility access gateway (or foreign agent) can optimize the resource usage on the network and can accurately bill the subscriber for received transmission packets, as opposed to billing the subscriber for dropped packets that are never received by the mobile node.

The present invention uses a Transient Binding Option message with a suspend/resume flag setting sent to the local mobility anchor from the foreign agent that was supporting downlink transmissions to the mobile node. Namely, a transient binding option is proposed for creating a transient Binding Cache Entry (BCE) state at the home agent/local mobility anchor during an inter-MAG (Mobile Access Gateway) handover, which will suspend down-link traffic from the home agent/local mobility anchor until the transient BCE (suspend) state is cleared by the foreign agent previously supporting downlink transmissions. After the transient BCE (suspend) state is cleared, the downlink traffic from the home agent/local mobility anchor can resume with forwarding of downlink traffic to the mobile node through the foreign agent. The present invention can be implemented using a new protocol application or modified messages from prior registration applications.

BRIEF DESCRIPTION OF THE DRAWINGS

The objects and features of the invention will become more readily understood from the following detailed description and appended claims when read in conjunction with the accompanying drawings in which like numerals represent like elements and in which:

The objects and features of the invention will become more readily understood from the following detailed description and appended claims when read in conjunction with the accompanying drawings in which like numerals represent like element.

DETAILED DESCRIPTION OF THE PREFERRED EMBODIMENTS

Figure 1:
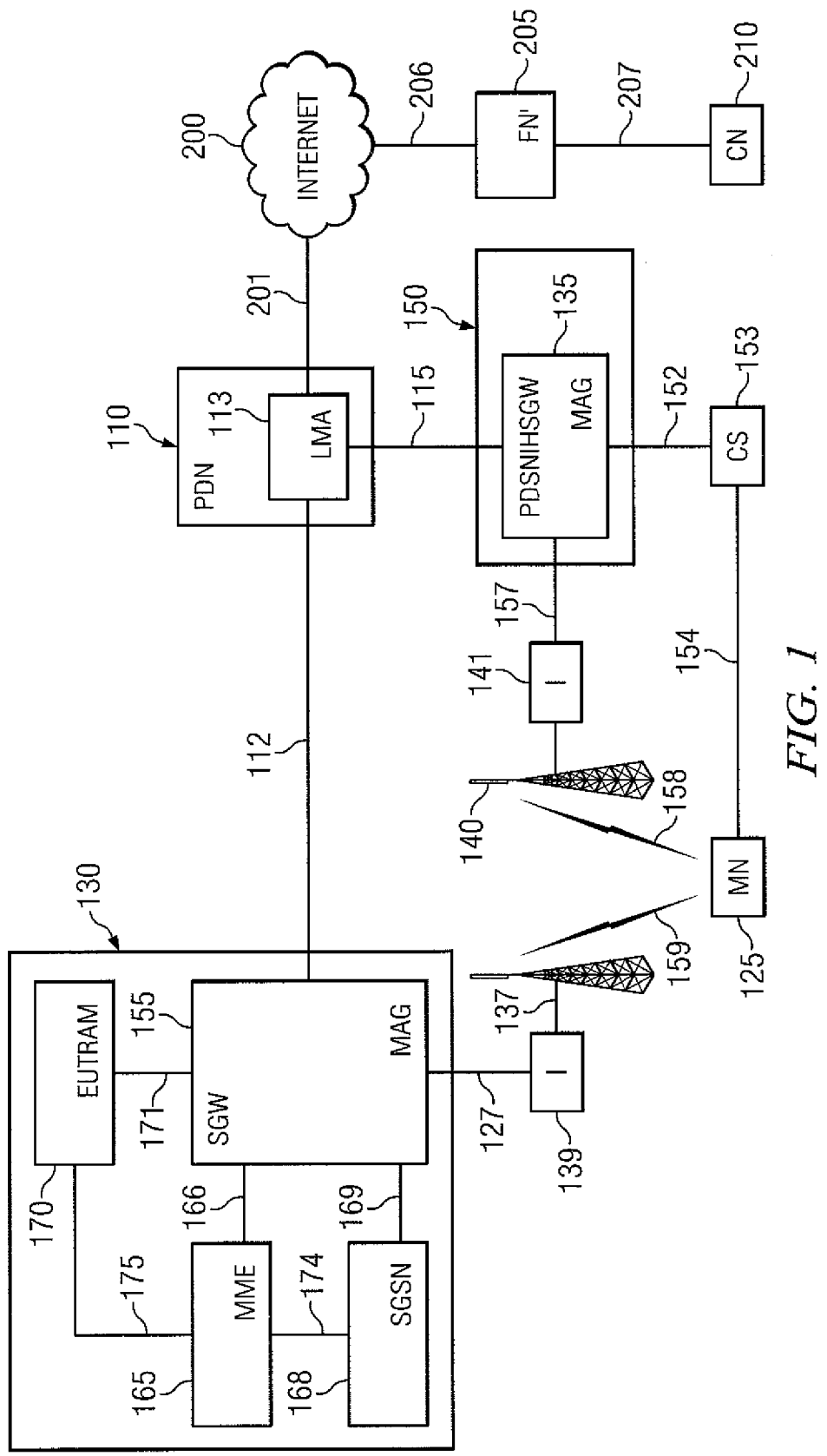
FIG. 1 is a mobile IP-based communication system as used in the present invention showing 3GPP and non-3GPP networks.

In FIG. 1, the overall architecture of the IP-based mobile system is shown with a mobile mode 125, a home network 110 and foreign networks 130 and 150, respectively. As shown in FIG. 1, the home network 110 has a home agent or local mobility anchor 113. The local mobility anchor 113 is coupled to the mobility access gateway (SGW) 155 on foreign network 130 by communication link 112, and local mobility anchor 113 is coupled to the mobility access gateway 135 on foreign network 130 by communication link 115. The mobility access gateway (SGW) 155 is coupled to MME 165 by communication link 166, Serving GPRS Support Node (SGSN) 168 by communication link 169, and EUTRAN server 170 by communication link 171. The Mobility Management Entry MME 165 is also coupled to the Serving GPRS Support Node (SGSN) 168 by communication link 174 and the Evolved Universal Terrestrial Radio Access Network EUTRAN server 170 by communication link 175. The home network 110 is coupled to the Internet 200 by link 201 and the Internet 200 is coupled to a foreign network FN 205 by communication link 206, which is coupled to a correspondent node (CN) 210 by link 207.

The mobility access gateway 155 is coupled to the mobile node 125 through the radio access system comprised of the base station transceiver 139 coupled to the antenna/transmitter 137 through the wireless communication link 127. The mobility access gateway 135 is coupled to the mobile node 125 through the radio access system comprised of the base station transceiver 141 coupled to the antenna/transmitter 140 through the wireless communication link 157. The mobility access gateway 135 is coupled the mobile node 125 using a second communication access type, such as a non-3GPP access type or circuit switched (CS) access, which is supported by the interface 141 and communication link 157 or CS interface 153 through communication links 152 and 154.

Mobile node 125 is shown electronically coupled to the foreign networks 130 and 150 via the wireless communication link 159 and 158, respectively. The mobile node 125, however, can communicate with any transceiver or access network coupled to a foreign network. That is, communications links 159 and 158 are radio transmitted links, but these links can be composed of any connection between two or more nodes on a network or users on networks or administrative domains.

The terms Local Mobility Anchor, home agent, and foreign agent may be as defined in the 3-GPP protocols defined by 3GPP TS23.402, but these agents are not restricted to a single protocol or system. In fact, the term home agent, as used in this application, can refer to a home mobility manager, home location register, home serving entity, or any other agent at a home network 110 having the responsibility to manage mobility-related functionality for a mobile node 125. Likewise, the term mobility access gateway, as used in this application, can refer to a foreign agent, serving mobility manager, visited location register, visiting serving entity, or any other agent on a foreign network having the responsibility to manage mobility-related functionality for a mobile node 125. The interface connections between the home agent LMA 113 and the foreign agent (MAG SGW) 155 may be defined by the S5 or S8 connections in the TS23.402 standard, and the connections between the home agent LMA 113 and the foreign agent (MAG SGW) 135 may be defined by the S2a and S2b connections described in the TS23.402 standard.

In the mobile IP communications system shown in FIG. 1, the mobile node 125 is identified by a permanent IP address. While the mobile node 125 is coupled to its home network 110, the mobile node 125 receives information packets like any other fixed node on the home network 110. When mobile, the mobile node 125 can also locate itself on foreign network, such as network 130 or 150. When located on foreign network 130 or 150, the home network 110 sends data communications to the mobile node 125 by "tunneling" the communications to the foreign network 130 or 150.

The mobile node 125 keeps the local mobility anchor 113 informed of its current location, or foreign network association, by registering a care-of address with the local mobility anchor 113. Essentially, the care-of address represents the foreign network where the mobile node 125 is currently located. If the local mobility anchor 113 receives an information packet addressed to the mobile node 125 while the mobile node 125 is located on a foreign network 130, the local mobility anchor 113 will "tunnel" the information packet to foreign network 130 for subsequent transmission to mobile node 125.

The foreign agent 155 participates in informing the local mobility anchor 113 of the mobile node 125 current care-of address. The foreign agent 155 also receives information packets for the mobile node 125 after the information packets have been forwarded to the foreign agent 155 by the local mobility anchor 113. Moreover, the foreign agent 155 serves as a default router for out-going information packets generated by the mobile node 125 while connected to the foreign network 130. The transfer of the communication packets from the home network 110 to the mobile node 125 is called downlink traffic, while the transfer of out-going communication packets from the mobile node 125 is called uplink traffic.

The mobile node 125 participates in informing the local mobility anchor 113 of its current location and requests connections to the associated foreign network. When the mobile node 125 transitions to connecting to a different access type on the foreign network or a wholly different foreign network (handover), the mobile node 125 obtains appropriate information regarding the address of the foreign network and/or the foreign agent from an agent advertisement.

When the mobile node 125 transitions to the foreign network 150, the MME 165 will inform the foreign agent (MAG SGW) 155 that the mobile node is no longer coupled to the foreign network 130. In that situation, all downlink traffic from the foreign agent (MAG SGW) will be dropped because the mobile node 125 is no longer coupled to the foreign network 130. The home agent (LMA) 113 on the home network 110, however, may continue to transmit downlink traffic to the foreign agent (MAG SGW) 115 because the home network has not been notified of the transition of the mobile node to the foreign network 150. As such, downlink traffic will continue to flow from the home network 110, and the subscriber will be billed for that downlink traffic even though the downlink traffic is dropped and is not delivered to the mobile node 125. Further, the billing count on the home network 110 will not match the billing count on the foreign network 150 in this situation because the home network 110 will bill for all downlink traffic sent to the foreign network 150 but the foreign agent LMA 155 will not bill for that downlink traffic to the mobile node 125 because that traffic was dropped and not delivered, which leads to a billing irregularity that will need to be reconciled.

Figure 2:
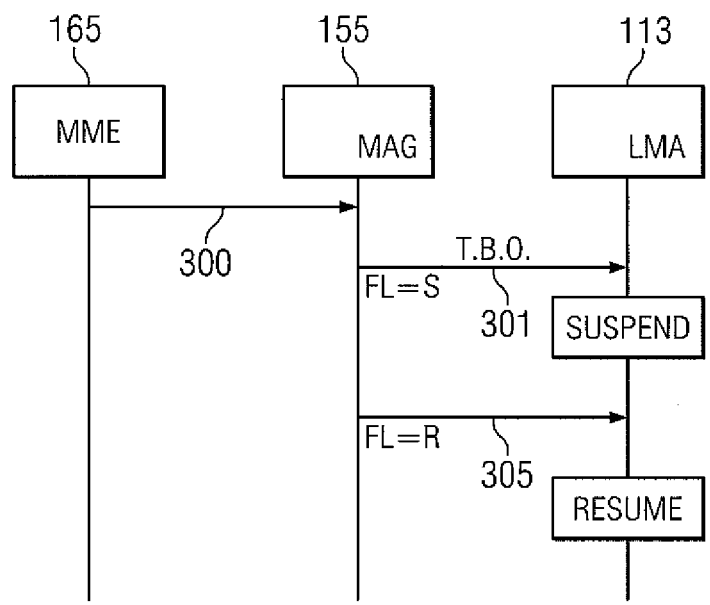
FIG. 2 shows a call flow diagram using the transient binding update messages and the expanded binding revocation trigger messages.

The invention solves this problem situation by using a Transient Binding Option message 301 shown in FIG. 2. The Transient Binding Option message 301 is prepared by the foreign agent (MAG SGW) 155 after receiving a notice message 300 from the MME 165 with an indication that the mobile node 125 has moved to a foreign network 150. In this situation, the foreign network may not support downlink traffic transmission to the mobile node 125 because of the particular access type supported on the foreign network 150. If the home network 110 continues to transmit downlink traffic to the mobile node 125 through the foreign network 130, the communications will be dropped and the billing irregularities will arise between the billing counts on the home agent LMA 113 and the billing counts on the foreign agent (MAG SGW) 155.

The Transient Binding Option message 301 is sent from the foreign agent (MAG SGW) 155 to the home agent LMA 113 with a suspend/resume flag set to the "Suspend" setting. In this instance, the "Suspend" setting of the suspend/resume flag may be valued at "1." When the home agent LMA 113 receives the suspend/resume flag in the Transient Binding Option message 301, the home agent suspends the transmission of downlink traffic for the specified session with the mobile node 125. This suspension of downlink traffic continues until the foreign agent (MAG SGW) 155 transmits a second Transient Binding Option message 305 to the home agent LMA 113 with a suspend/resume flag set to the "Resume" setting. In that instance, the mobile node 125 may be re-connected to the foreign network 130, so the downlink traffic can continue to be transmitted to the mobile node 125 through the foreign agent (MAG SGW) 155 on foreign network 130 or when the mobile node 125 is coupled to a foreign network 150 that supports an access type that will allow downlink communication transmissions. The invention eliminates the billing inconsistencies and reduces the amount of dropped transmissions to the mobile node 125.

The Transient Binding Option message can create a BCE state at the home agent LMA 113 during the inter-MAG handover. The Transient Binding Option message 301 may use a flag setting in a Proxy Binding Update message or other messages depending on the vendor specific extensions available and the access types used by the networks. The Transient Binding Option message 301 should be sent from the same foreign agent (MAG SGW) 155 that is servicing downlink traffic to the mobile node 125. When the home agent LMA 113 receives a Transient Binding Option message 301 from the same foreign agent (MAG SGW) 155 that is servicing downlink traffic, the home agent LMA 113 will determine that the downlink traffic is not subject to any handover to the foreign network 150 and the home agent LMA 113 will maintain the "Suspend" state. Upon the transmission of a "Resume" flag in a Transient Binding Option message 305 to the LMA 113, the downlink traffic shall resume transmission.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention.

Having described the invention,

We claim:

1. A method for suspension and resumption of communication transmission to a mobile node comprising the steps of:

receiving a first message at a local mobility anchor from a first foreign access gateway on a first foreign network, said first message having a suspend setting, said first foreign access gateway controlling downlink transmissions to the mobile node from the local mobility anchor under a 3GPP transmission protocol, said first message prepared in response to the movement of the mobile node to a second foreign network that does not support downlink communication transmissions to the mobile node;

suspending at the local mobility anchor further downlink transmissions from the local mobility anchor to the mobile node in response to receiving the first message from the first foreign access gateway controlling downlink transmissions to the mobile node;

receiving a second message at the local mobility anchor from said first foreign access gateway on the first foreign network, said second message having a resume setting, said first foreign access gateway controlling downlink transmissions to the mobile node from the local mobility anchor, wherein the second message is different from a registration message from the mobile node to the local mobility anchor via the first foreign access gateway; and resuming at the local mobility anchor downlink transmissions from the local mobility anchor to the mobile node in response to receiving the second message from the first foreign access gateway controlling downlink transmissions to the mobile node.

2. The method of claim 1 wherein the local mobility anchor receives a first message prepared by the first foreign access gateway in response to a notification from mobility manager that the mobile node has changed its foreign network connection to the second foreign network.

3. The method of claim 2 wherein the mobility manager is a Mobility Management Entity.

4. The method of claim 1 wherein the interface connection between the local mobility anchor and the first foreign access gateway are defined by the S5 or the S8 3GPP connections.

5. The method of claim 1 wherein the interface connection between the local mobility anchor and the second foreign network are defined by the S2a or S2b 3GPP connections.

6. The method of claim 1, wherein the local mobility anchor and the first foreign access gateway each performs a billing count for downlink traffic to the mobile node.

7. A method for controlling communication transmissions to a mobile node comprising the steps of:
receiving a first message at a local mobility anchor from a first foreign access gateway on a first foreign network, said first message having a suspend setting, said first foreign access gateway controlling downlink transmissions to the mobile node from the local mobility anchor, said first message prepared in response to the movement of the mobile node to a second foreign network that does not support downlink communication transmissions to the mobile node;
suspending at the local mobility anchor further downlink transmissions from the local mobility anchor to the mobile node in response to receiving the first message from the first foreign access gateway controlling downlink transmissions to the mobile node;
receiving a second message at the local mobility anchor from said first foreign access gateway on a first foreign network, said second message having a resume setting, wherein the second message is different from a registration message from the mobile node to the local mobility anchor via the first foreign access gateway; and
resuming at the local mobility anchor downlink transmissions from the local mobility anchor to the mobile node in response to receiving the second message from the first foreign access gateway controlling downlink transmissions to the mobile node.

8. The method of claim 7 wherein the local mobility anchor receives said first message prepared by the first foreign access gateway in response to a notification from mobility manager that the mobile node has changed its foreign network connection to the second foreign network.

9. The method of claim 8 wherein the mobility manager is a Mobility Management Entity.

10. The method of claim 7 wherein said first foreign access gateway controls downlink transmissions to the mobile node from the local mobility anchor under 3GPP protocols.

11. The method of claim 7 wherein the interface connection between the local mobility anchor and the first foreign access gateway are defined by the S5 or the S8 3GPP connections.

12. The method of claim 7 wherein the interface connection between the local mobility anchor and the second foreign network are defined by the S2a or S2b 3GPP connections.

13. The method of claim 7, wherein the local mobility anchor and the first foreign access gateway each performs a billing count for downlink traffic to the mobile node.

14. A communications network comprising:
a home network having a local mobility anchor coupled to a first foreign network, said first foreign network having a first foreign access gateway that is connected to a mobile node, said first foreign access gateway supports downlink transmissions from the local mobility anchor to the mobile node coupled to the first foreign network,
said local mobility anchor suspends downlink transmissions to the mobile node through the first foreign access gateway in response to receiving a first message having a suspend setting from said first foreign access gateway on the first foreign network, said first message being prepared by the first foreign access gateway in response to the movement of the mobile node to a second foreign network that does not support downlink communication transmissions to the mobile node; and
said local mobility anchor resumes downlink transmission from the local mobility anchor to the mobile node after receiving a second message having a resume setting from said first foreign access gateway on the first foreign network, wherein the second message is different from a registration message from the mobile node to the local mobility anchor via the first foreign access gateway.

15. The method of claim 14 wherein the first message is prepared by the first foreign access gateway in response to a notification from mobility manager that the mobile node has changed its foreign network connection to the second foreign network.

16. The method of claim 15 wherein the mobility manager is a Mobility Management Entity.

17. The method of claim 14 wherein said first foreign access gateway controls downlink transmissions to the mobile node from the local mobility anchor under 3GPP protocols.

18. The method of claim 14 wherein the interface connection between the local mobility anchor and the first foreign access gateway are defined by the S5 or the S8 3GPP connections.

19. The method of claim 14 wherein the interface connection between the local mobility anchor and the second foreign network are defined by the S2a or S2b 3GPP connections.

20. The method of claim 14, wherein the local mobility anchor and the first foreign access gateway each performs a billing count for downlink traffic to the mobile node.

\* \* \* \* \*